United States Patent
Chudnovsky et al.

(10) Patent No.: US 8,019,575 B1
(45) Date of Patent: Sep. 13, 2011

(54) STATE PROJECTION VIA MINIMIZATION OF ERROR ENERGY

(75) Inventors: Victor Chudnovsky, Brookline, MA (US); Jeff Wendlandt, Newton, MA (US)

(73) Assignee: The MathWorks, Inc., Natick, MA (US)

( * ) Notice: Subject to any disclaimer, the term of this patent is extended or adjusted under 35 U.S.C. 154(b) by 1000 days.

(21) Appl. No.: 11/479,003

(22) Filed: Jun. 30, 2006

(51) Int. Cl.
*G06F 7/60* (2006.01)
*G06G 7/48* (2006.01)

(52) U.S. Cl. ............................................. 703/2; 703/6
(58) Field of Classification Search ................... 703/2, 6
See application file for complete search history.

(56) References Cited

U.S. PATENT DOCUMENTS

| 7,167,817 B2 * | 1/2007 | Mosterman et al. ............. 703/2 |
| 2002/0183990 A1 * | 12/2002 | Wasynczuk et al. ............. 703/2 |
| 2004/0210426 A1 * | 10/2004 | Wood ................................ 703/2 |

OTHER PUBLICATIONS

"Efficient Context-Based Entropy Coding for Lossy Wavelet Image Compression", Chrysafis. IEEE 1997.*
"Dymola Modeling Laboratory User's Manual". Version 5.0. Copyright by Dynasium. 1992-2002.*

* cited by examiner

*Primary Examiner* — Jason Proctor
*Assistant Examiner* — Nithya Janakiraman
(74) *Attorney, Agent, or Firm* — Nelson Mullins Riley & Scarborough LLP

(57) ABSTRACT

The present invention improves in one aspect the accuracy, efficiency, and robustness of fixed-step solvers when simulating a physical system that does not change in energy at the critical event. The present invention uses the energy of the error as the figure of merit in finding the first state of the system under the new constraints. The present invention enables a fixed-step solver to be more robust even when the critical event falls between two time samples. The present invention may also be applied to variable-step solvers. Moreover, the present invention may also be used to simulate a physical system when the energy changes at the critical event in the physical system.

27 Claims, 8 Drawing Sheets

STATE PROJECTION VIA MINIMIZATION OF ERROR ENERGY

TECHNICAL FIELD

The present invention generally relates to computational simulation of physical systems, and more specifically to using fixed-step numerical solvers to simulate the physical systems.

BACKGROUND OF THE INVENTION

Various classes of graphical models describe computations that can be performed on computational hardware, such as a computer, microcontroller, field programmable gate array (FPGA), and custom hardware. Classes of such graphical models include time-based block diagrams such as those found within Simulink® from The MathWorks, Inc. of Natick, Mass., state-based and flow diagrams, such as those found within Stateflow® from The MathWorks, Inc. of Natick, Mass., entity-flow diagrams such as those found within SimEvents from The MathWorks, Inc. of Natick, Mass., dataflow diagrams, circuit diagrams, and software diagrams, such as those found in the Unified Modeling Language (UML), for example. UML is available from object management group (OMG). A common characteristic among these various forms of graphical models is that they define semantics on how to execute the graphical syntax of the model.

Historically, engineers and scientists have utilized graphical models in numerous scientific areas such as Feedback Control Theory and Signal Processing to study, design, debug, and refine dynamic systems. Dynamic systems, which are characterized by the fact that their behaviors change over time, or the fact that their states change or the fact that their behaviors change due to a system environment, are representative of many real-world systems. Graphical modeling has become particularly attractive over the last few years with the advent of software packages such as Simulink® from The MathWorks, Inc. of Natick, Mass. Such packages provide sophisticated software platforms with a rich suite of support tools that makes the analysis and design of dynamic systems efficient, methodical, and cost-effective.

A dynamic system, either natural or man-made, is a system whose response at any given time is a function of its inputs, its current state, the current time, and other input parameters. Such systems range from simple to highly complex systems. Physical dynamic systems include a falling body, the rotation of the earth, bio-mechanical systems (muscles, joints, etc.), bio-chemical systems (gene expression, protein pathways), weather and climate pattern systems, etc. Examples of man-made or engineered dynamic systems include: a bouncing ball, a spring with a mass tied on an end, automobiles, airplanes, control systems in major appliances, communication networks, audio signal processing, nuclear reactors, a stock market, etc.

Professionals from diverse areas such as engineering, science, education, and economics build graphical models of dynamic systems in order to better understand system behavior as it changes with the progression of time. The graphical models aid in building "better" systems, where "better" may be defined in terms of a variety of performance measures such as quality, time-to-market, cost, speed, size, power consumption, quality of service (QoS), robustness, etc. The graphical models also aid in analyzing, debugging and repairing existing systems (be it the human body or the anti-lock braking system in a car). The models may also serve the purpose of educating others on the basic principles governing physical systems. The models and results are often used as a scientific communication medium between humans. The term "model-based design" is used to refer to the use of graphical models in the development, analysis, and validation of dynamic systems, such as, for example, control systems and signal processing systems.

Graphical modeling environments such as Simulink® and various modeling applications associated with Simulink®, such as SimMechanics, SimPowerSystems, SimHydraulics, and SimDriveline, assist in simplifying the process of designing, simulating, and implementing dynamic systems. A graphical model can be a representation of a real-world system. The graphical representation of a dynamic system often consists of a graph containing nodes (i.e. blocks) interconnected by edges (i.e. lines). The blocks may be functional entities that perform mathematical operations, transformations, or both or enforce constraints on the data and information being processed by the system.

The simulation of a physical system involves solving a set of differential and algebraic equations (DAEs) where a set of algebraic constraints may specify the relationship of different body elements in the physical system, the relationship of different capacitor and inductor elements in the physical system, the relationship of different fluid capacity and inertia elements in the physical system, etc. Typically, the system evolves for a certain length of simulation time, optionally synchronized with real-time to facilitate, for example, hardware-in-the-loop simulation, under a fixed set of constraints. During this evolution, however, events may occur that change the set of active constraints of the system. After the set of constraints changes, the simulation continues under the new fixed set of constraints. Hence, the simulation solver needs to transition from using the old constraints to using the new constraints when the event occurs and signals a change in the relationship of the different elements in the physical system.

Simulation solvers can be generally separated into two categories: variable-step solvers and fixed-step solvers. Variable-step solvers can change the time step used throughout the simulation and hence can often detect precisely the exact time at which the set of the constraints of the physical system changes. However, it is difficult to estimate how long (in real time) the simulation will take using the variable-step solvers. In contrast, fixed-step solvers use simulation time steps of fixed duration to solve the simulation and, hence, the amount of real time that it will take to simulate the physical system can be predicted. However, because fixed-step solvers may not change the time step used within the simulation, it is very likely that the fixed-step solvers only detect the event signaling a change in constraints after the simulation has overshot the transition time. Once the fixed-step solvers detect the event, a different set of differential and algebraic equations and/or algebraic constraints are used to simulate the physical system. However, because of the overshot of the transition time, the subsequent simulation results of the physical system can be erroneous or inaccurate. One can usually mitigate this problem by decreasing the fixed simulation time step used by the fixed-step solvers; however, this is disadvantageous because the total simulation (real) time increases, sometimes dramatically, and oftentimes becomes unreasonable and impractical. Alternatively, more sophisticated algorithms and/or algorithms with fewer approximations can be used to accurately simulate the physical system by the fixed-step solvers. One approach is to employ a zero-crossing location algorithm to establish precisely when an indicator function generates the event, which often applies an iterative search to find the time where the resultant of the indicator function changes to zero, changes from zero, or crosses zero. However such an approach will also lengthen the overall simulation time. Hence there is a need to improve the use of fixed-step solvers such that both accuracy and efficiency can be preserved.

SUMMARY OF THE INVENTION

In one aspect, the present invention improves the accuracy, efficiency, and robustness of fixed-step solvers when simulating a physical system that does not change in energy at the critical event. A critical event is defined herein as an event that occurs at the point in time when constraints of the physical system change. A physical system can be modeled using a set of differential and algebraic equations. In one aspect, the present invention minimizes the energy of the error between the first state simulated under the old constraint and the second state simulated under the new constraint so that for physical systems that do not change in energy at the critical event, conservation of energy will be satisfied given the overshot state at the time sample when the critical event is detected, even when using fixed-step solvers. The present invention recognizes that critical events can fall between two time samples, and, hence, the present invention minimizes the error because of the inability to place a sampling time at the critical point, which is usually what happens when a fixed-step solver is used. The present invention enables a fixed-step solver to be more robust even when large time steps are used. One of ordinary skill in the art will appreciate that the present invention may also be applied in simulating a system in which energy does change at a critical event.

In one embodiment of the present invention, a method for simulating a system of differential and algebraic equations (DAEs) is provided. The method includes the step of simulating the system of DAEs under a first set of constraints at a first time sample. The method further includes the step of detecting an event signaling a change in the first set of constraints to a second set of constraints. The event can occur between the first time sample and a second time sample, wherein the second time sample is one time step after the first time sample. The method also includes the step of receiving a first state of the system simulated under the first set of constraints. The method further includes the step of calculating a second state of the physical system simulated under a second set of constraints by minimizing an energy of an error between the second state and a state derived from the first state. The state derived from the first state can be the same as the first state. Alternatively, the state derived from the first state can be an intermediate state derived from the first state.

In one aspect of the present invention, a fixed-step solver is used to simulate the system. Alternatively, a variable-step solver is used to simulate the system. The second state of the system simulated under the second set of constraints and the first state of the system simulated under the first set of constraints may both occur at the second time sample. The second state of the physical system simulated under the second set of constraints may instead occur at a third time sample that is one time step after the second time sample and the intermediate state may be calculated based on the second set of constraints and using the first state of the system simulated under the first set of constraints as initial conditions. The first set of constraints can describe a first relationship among a plurality of gears before a clutch locks and the second set of constraints can describe a second relationship among the plurality of gears after the clutch locks. In another aspect of the present invention, the calculation of the second state of the system simulated under the second set of constraints involves the use of a so-called mass matrix associated with the energy of the system defined by a quadratic form of the states. The mass matrix may be a non-parameterized (constant) or a parameterized matrix that may lead to a nonlinear problem formulation. In a further aspect of the present invention, the method further includes the step of projecting the first state onto the second set of constraints in one operation. In still another aspect of the present invention, the second state of the system simulated under the second set of constraints includes one or more user-specified states.

In another embodiment of the present invention, a computer-readable medium storing instructions for enabling a computing device to simulate a system of DAEs is provided. The medium includes the instructions for simulating the system of DAEs under a first set of constraints at a first time sample and detecting an event signaling a change in the first set of constraints to a second set of constraints. The medium also includes the instructions for receiving a first state of the system simulated under the first set of constraints. The medium further includes the instructions for calculating a second state of the system simulated under the second set of constraints by minimizing an energy of an error between a state derived from the first state and the second state.

In a further embodiment of the present invention, a system for simulating a system of DAEs is provided. The system includes a modeling facility including a critical event energy minimizer for minimizing an energy of an error between a state derived from a first state simulated under a first set of constraints and a second state simulated under a second set of constraints, wherein a critical event occurs that causes the modeling facility to change from simulating the system under the first set of constraints to simulating the system under the second set of constraints. The critical event may occur between two time samples. The state derived from the first state can be the same as the first state or an intermediate state derived from the first state.

In one aspect of the present invention, the first set of constraints describes a first relationship among a plurality of gears before a clutch locks and the second set of constraints describes a second relationship among the plurality of gears after the clutch locks. In modeling an electrical system with a switch, the first set of constraints can describe a relationship between the electrical connections before a switch closes and the second set of constraints can describe the relationship between the electrical connections after the switch closes. Similarly, in a multi-body system, the first set of constraints can be a relationship between the contact points of two bodies before they are in contact and the second set of constraints can be their relationship after they are in contact. In another aspect of the present invention, the critical event energy minimizer calculates the second state of the system simulated under the second set of constraints using a so-called mass matrix associated with the energy of the system defined by a quadratic form of the states. In still another aspect of the present invention, the mass matrix or the moment of inertia matrix may be a non-parameterized (constant) or a parameterized matrix that may lead to a nonlinear problem formulation. In yet another aspect of the present invention, the critical event energy minimizer minimizes the energy of the error by projecting the first state onto the second set of constraints in one operation. In still another aspect of the present invention, the second state of the system simulated under the second set of constraints retains a user-specified state.

BRIEF DESCRIPTION OF THE FIGURES

The foregoing and other objects, aspects, features, and advantages of the invention will become more apparent and may be better understood by referring to the following description taken in conjunction with the accompanying drawings, in which.

DETAILED DESCRIPTION

The present invention in one aspect improves the accuracy, efficiency, and robustness of fixed-step solvers especially when simulating a physical system that does not change in energy at the critical event. The present invention may also be used with a variable-step solver as well when there is restraint in the number of time steps used or the size of the time step in the simulation. Additionally, the present invention may also be used with a system that has a change in energy at the critical event. One of ordinary skill in the art will appreciate that the present invention is not limited to the exemplary usage listed herein, and the exemplary usage should not be used to limit the scope of the present invention. In many conventional simulations, an approximation that simplifies analysis without too great a cost in accuracy is often used. Variable-step solvers are able to utilize algorithms that involve many approximations because the solvers can modify the time steps to be small enough around the critical points if necessary such that the approximations are still valid. However, the same approximation algorithms do not always work well with fixed step solvers because sometimes the critical event falls between two time samples $t_1$ and $t_2$ ($t_1 < t_2$) and the critical event is only detected at $t_2$. When the critical event is detected, the fixed step solver uses the new constraints to simulate the system, but since erroneous or inaccurate simulation results are obtained at $t_2$ because of the delay in detection of the critical event, subsequent simulation results obtained from the new constraints are also erroneous or inaccurate if the errors or inaccuracies from the simulation results at $t_2$ are not retroactively corrected or minimized.

Figure 1A:
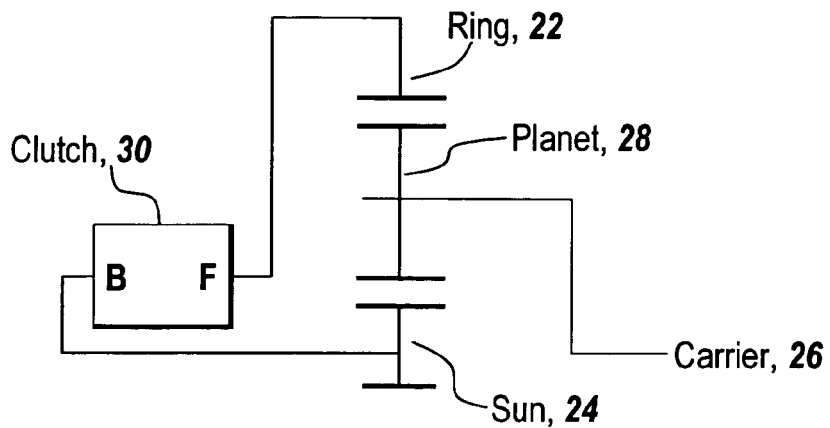
FIG. 1A illustrates a schematic of an exemplary planetary gear system for which a model may be created and simulated in an illustrated embodiment of the present invention.
Figure 1B:
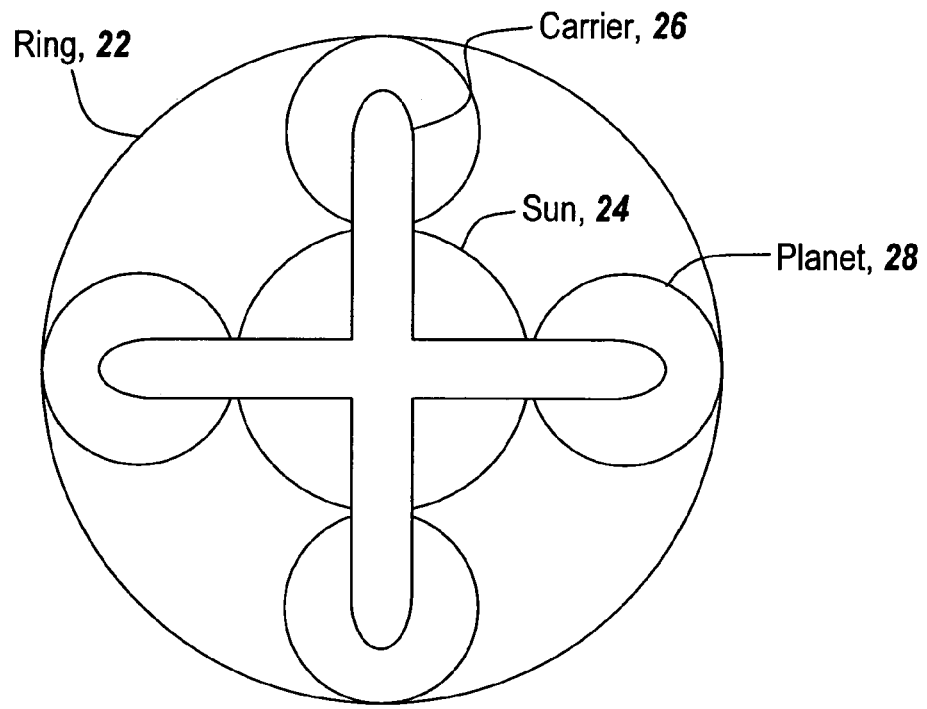
FIG. 1B illustrates an exemplary front view of the exemplary planetary gear system in FIG. 1A for which a model may be created and simulated in an illustrated embodiment of the present invention.

For example, in a simulation of a driveline system having gears such as shown in FIG. 1B with a schematic such as FIG. 1A, carrier 26 drives four planet gears 28 and also provides input (not shown) into the system. Clutch 30 is used to lock the ring gear 22 with the sun gear 24. The simulation of the driveline system tries to simulate the behavior (velocities) of the gears before and after the clutch 30 locks (a critical event) the ring gear 22 with the sun gear 24.

Figure 2A:
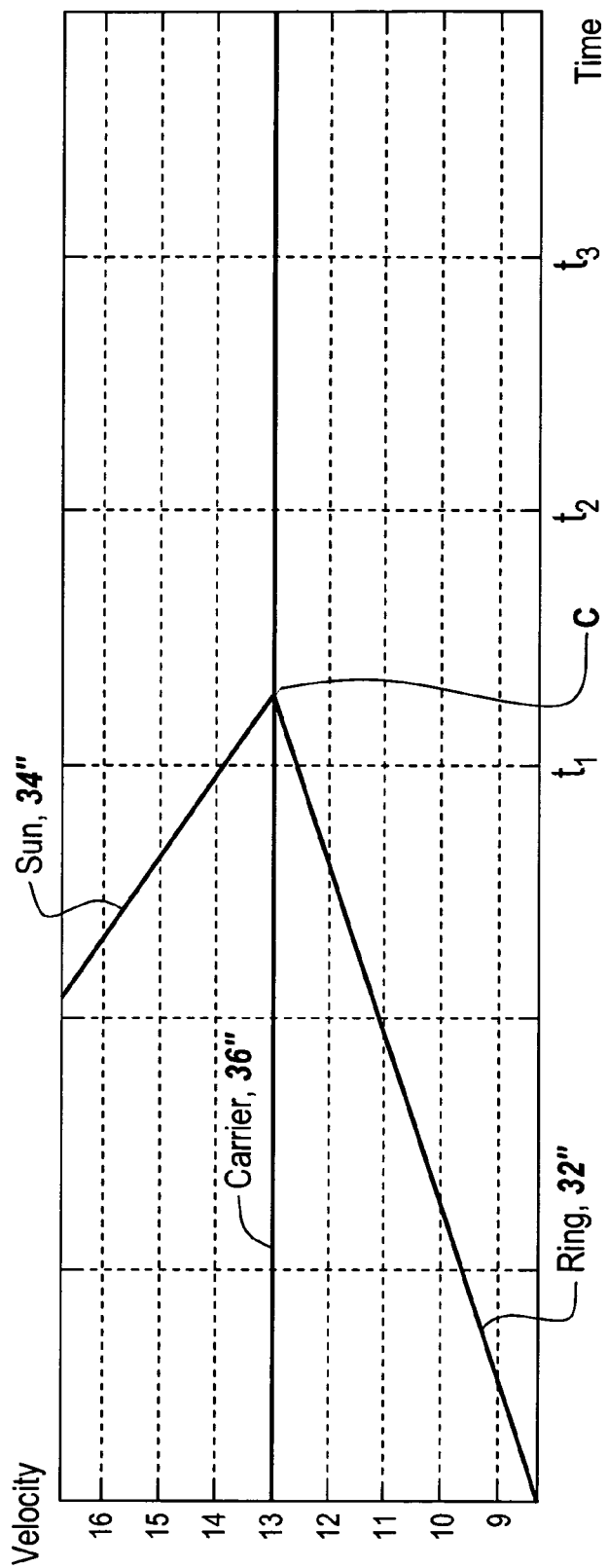
FIG. 2A illustrates simulation results of the system in FIG. 1A around a critical point using a variable-step solver as known in the prior art.

FIG. 2A shows the simulation results of an accurate variable-step simulation where the energy does not change at the instant of the critical event. Ring velocity 32'', sun velocity 34'', and carrier velocity 36'' show the respective velocities of the ring gear 22, sun gear 24, and carrier 26. Since most of the energy is in the rotating carrier shaft, the velocity of this shaft remains essentially constant during the simulation. The kinetic energy of the system (ring gear 22, sun gear 24, and carrier 26) stays the same after the critical event at time C. No increase (or decrease) of the energy is observed from the figure.

Figure 2B:
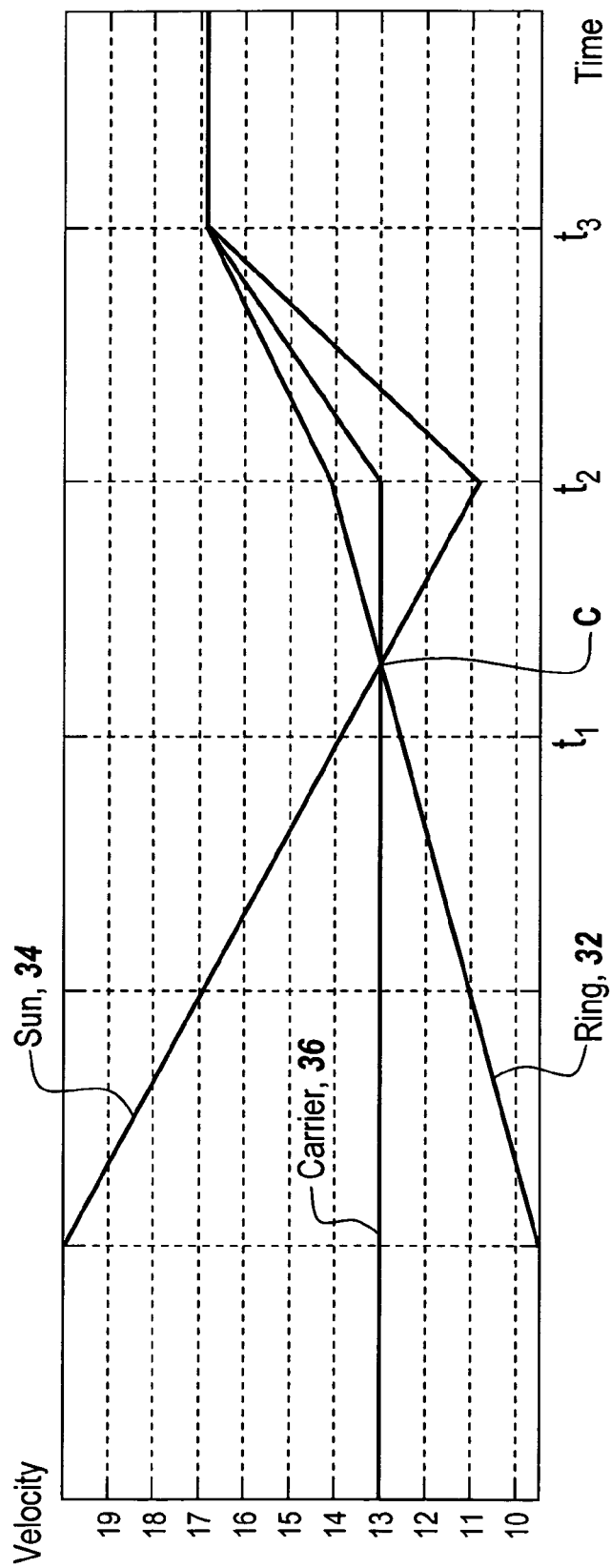
FIG. 2B illustrates simulation results of the system in FIG. 1A around a critical point using a fixed-step solver as known in the prior art.

FIG. 2B shows an example of the simulation results of the driveline system using a conventional fixed point solver when the critical event falls between two time samples $t_1$ and $t_2$ ($t_1 < t_2$). Ring velocity 32, sun velocity 34, and carrier velocity 36 show the respective velocities of the ring gear 22, sun gear 24, and carrier 26 as time progresses. The fixed step solver tries to use the new constraints to simulate the system after detecting the critical event at time $t_2$. However, the erroneous simulation results at $t_2$ are used as initial values for the new set of DAEs and are not properly corrected to account for the new constraints, which yields further erroneous results at time $t_3$ and beyond as seen in FIG. 2B. The erroneous results indicate an increase in kinetic energy, which is unrealistic in the physical world. Hence, these erroneous simulation results are not desirable.

The present invention provides a method and system to remedy the above mentioned problem so that more physically-meaningful simulation results are obtained. The present invention uses a minimization technique to minimize the energy of the error between the erroneous simulation results obtained from the old constraints and the unknown simulation results to be obtained from the new constraints. In a preferred embodiment of the present invention, the minimization occurs at the time sample when the critical event is detected. In another embodiment of the present invention, the minimization occurs at a time sample after the critical event is detected. One application of the present invention is in situations where there is no change in kinetic energy of the physical system when a critical event occurs. In one embodiment, the present invention enables the fixed-step solvers to maintain the use of the same efficient approximation algorithms as variable step solvers during most of the simulation and yet ensure accuracy and efficiency. Hence the fixed-step solvers are made more robust and accurate in handling situations where the critical event falls between two time samples, especially when the time steps are large. One of ordinary skill in the art will appreciate that the present invention is also applicable to variable-step solvers when the critical event falls between two time samples even though the time steps are variable in the simulation. The present invention can also be applied when the critical event occurs exactly at a time sample and/or when there is a change in energy in the system.

Figure 3:
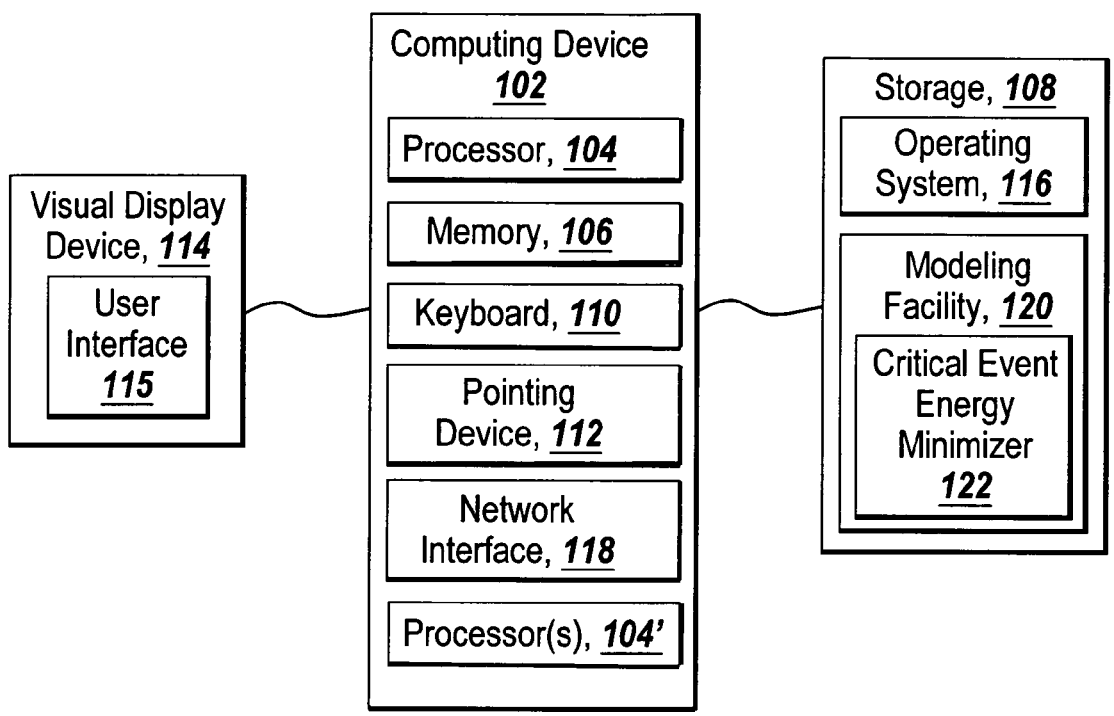
FIG. 3 illustrates an environment suitable for practicing the present invention.

FIG. 3 depicts an environment suitable for practicing an illustrative embodiment of the present invention. The environment includes a computing device 102 having memory 106, on which software according to one embodiment of the present invention may be stored, processor 104 and optionally processor(s) 104' for executing software stored in the memory 106, and other programs for controlling system hardware. Processor 104 and processor(s) 104' can be a single or multiple core processor. Virtualization can be employed in computing device 102 so that infrastructure and resources in the computing device can be shared dynamically. Virtualized processors may also be used with modeling facility 120 and other software in storage 108. A virtual machine can be provided to handle a process running on multiple processors so that the process appears to be using only one computing resource rather than multiple. Multiple virtual machines can also be used with one processor. Other computing resources, such as field programmable gate arrays (FPGA), application specific integrated circuit (ASIC), application specific instruction-set processor (ASIP), digital signal processor (DSP), and general purpose processor (GPP), may also be used for executing code and/or software. A hardware accelerator can additionally be used to speed up the general processing rate of the computing device 102.

The memory 106 may comprise a computer system memory or random access memory such as DRAM, SRAM, EDO RAM, etc. The memory 106 may comprise other types of memory as well, or combinations thereof. A user may interact with the computing device 102 through a visual display device 114 such as a computer monitor, which may include a user interface 115. The computing device 102 may include other I/O devices such as a keyboard 110 and a pointing device 112, for example a mouse, for receiving input from a user. Optionally, the keyboard 110 and the pointing device 112 may be connected to the visual display device 114. The computing device 102 may include other suitable conventional I/O peripherals. The computing device 102 may further comprise a storage device 108, such as a hard-drive or CD-ROM, for storing an operating system 116 and other related software, and for storing modeling facility 120, such as Simulink®, SimDriveline, SimMechanics, SimHydraulics, SimPowerSystems, all from The MathWorks, Inc. of Natick Mass. Modeling facility 120 can be, but is not limited to, an application, a program, a module, or a script. Modeling facility 120 includes a critical event energy minimizer 122 to minimize change in error energy when a critical event is detected. Critical event energy minimizer 122 can be part of the modeling facility 120 or it can be an add-on module to the modeling facility 120. Additionally, the operating system 116 and executable process 120 can be run from a computer readable media, such as, for example, KNOPPIX®, a bootable CD for GNU/Linux.

Additionally, the computing device 102 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 102 to any type of network capable of communication and performing the operations described herein. Moreover, the computing device 102 may be any computer system such as a workstation, desktop computer, server, laptop, handheld computer or other form of computing or telecommunications device that is capable of communication and that has sufficient processor power and memory capacity to perform the operations described herein, either standalone or in a networked configuration.

The computing device 102 can be running any operating system such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein.

Before continuing below, it is helpful to define a few terms used herein.

As used herein, the term "body element" refers to the basic element of a mechanical system or machine. A body element is characterized by its mass or moment of inertia properties, its position and orientation in space, and any attached body coordinate systems. Body elements can be connected to one another by joints, constraints, or drivers.

As used herein, the term "state" refers to a variable in a dynamic system whose derivative also appears when the system is written as a set of first order differential and algebraic equations. The state variables are integrated in time to calculate the time evolution of all of the variables in the system. For mechanical systems, the state variables can be position and velocity variables. For electrical systems, the state variables can be voltage and current. For hydraulic systems, state variables can be pressure and flow. For rotational mechanics, state variables can be torque and angular velocity. For some systems, some of the state variables can be calculated after integrating the system by using the time history of other state variables. For example, certain dynamics of mechanical systems can be represented by equations that are only based on velocity variables and do not explicitly contain position variables in the equations. The position variables can be calculated later by integrating the corresponding velocity variables.

As used herein the term "constraint" refers to a restriction among states in a model of a system. A constraint removes one or more independent states, unless that constraint is redundant and restricts states that are already constrained. The relationship specified by a constraint can be an explicit function of time or not. The relationship specified by a constraint can be static and does not change during the course of simulation. For example, this is applicable to the relative velocities of two shafts connected by a simple gear. On the other hand, the relationship specified by a constraint can also be dynamic and change during the course of the simulation. For example, this is applicable to the situation where a clutch is locked during the simulation, thereby constraining the velocities of the shafts connected to the clutch. Similarly, in case of a rigid bar rotating on a ball, the point around which the bar rotates is variable over time, and, therefore, the constraints between the velocities of the tips of the bar change over time. One aspect of the present invention is pertinent to dynamic constraints. The algebraic equations that define a set of constraints define a manifold in the abstract space of the unconstrained states of the system, which is a surface or domain that includes all the possible system states that satisfy the set of constraints. The physical system is said to satisfy the set of constraints when the state it is in can be said to lie on the manifold defined by the equations that define the set of constraints. The present invention can be conceptualized as "projecting" the state of the system which does not lie on the manifold in the "previous" state to a point on the manifold that corresponds to the first state of the system but under the new constraints. In the case of a dynamic constraint, even if the point in time when the constraints change can be determined precisely, for example, by using a variable-step solver, the state of the system still has to be projected to a point on the new manifold. In general, the projection is required for dynamic constraints, particularly when one or more independent states are removed.

Figure 4:
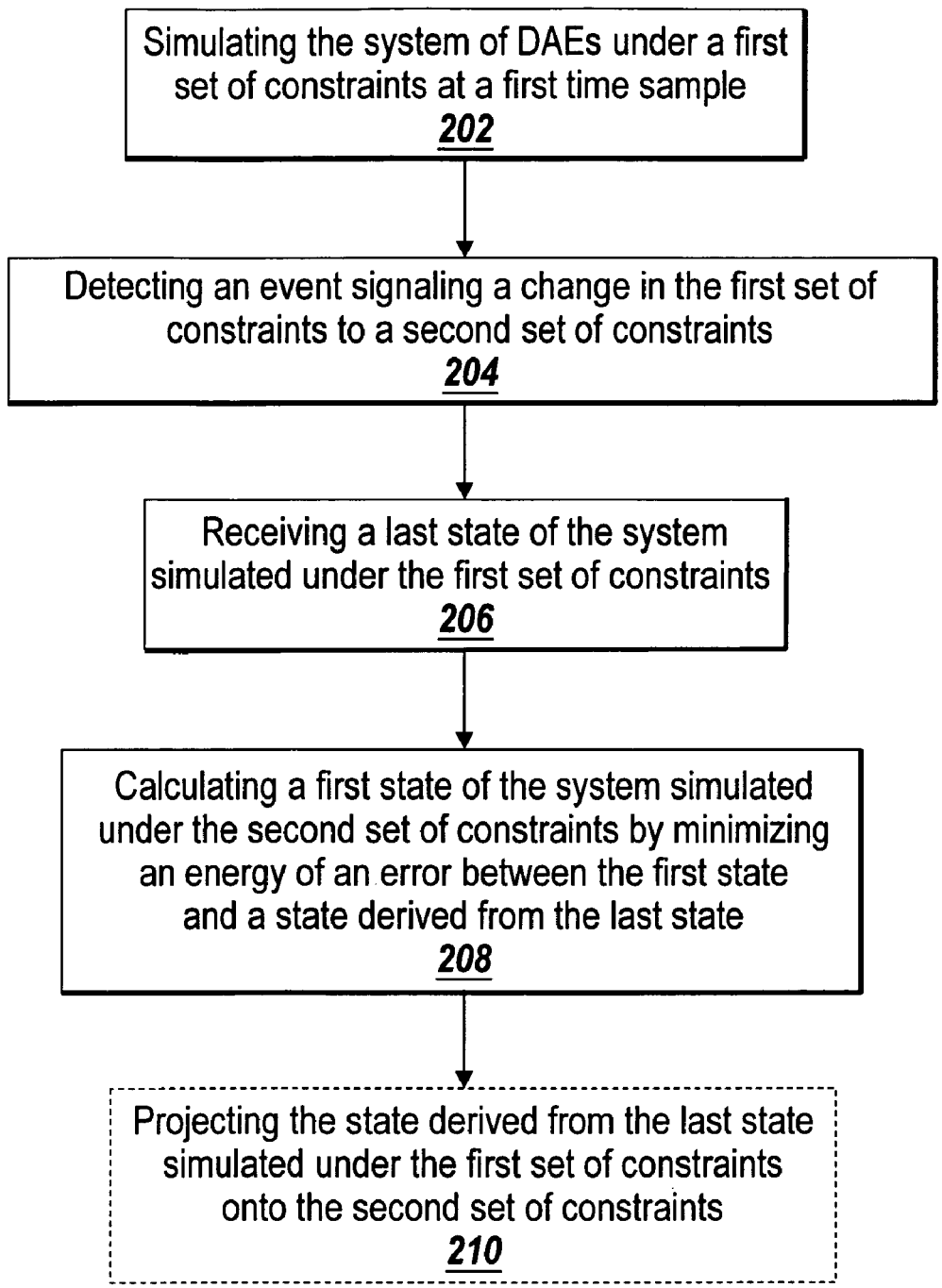
FIG. 4 illustrates a flowchart depicting the steps taken to practice one embodiment of the present invention.

FIG. 4 illustrates a flowchart depicting steps taken to practice one embodiment of the present invention. In step 202, a physical system that is modeled using a set of differential and algebraic equations (DAEs) is simulated by the modeling facility 120 under a first set of constraints. Let the full set of states of the physical system be denoted by the $n_s$-component vector $x=x(t)$. In a planetary gear system, x can be used to correspond to angular velocities of the individual gears. In step 204, the modeling facility detects a critical event signaling a change in the first set of constraints to a second set of constraints. The event can occur between two time samples ($t_1$ and $t_2$, where $t_1 < t_2$ and the detection of the critical event occurs at time $t_2$). For example, a critical event in the planetary gear system example can be one or more clutches being locked, limiting the movements of one or more gears. At any time t, let the vector $y=y(t)$ with length $n_r$ denote the set of currently independent states, from which the full set of states can be obtained by employing the suitable mapping matrix P through the relation $$x = Py + g \qquad (1)$$

Here, the vector $g=g(t)$ denotes one or more user specified states that are included in the system state x. The user can prescribe in g any external input into the system. The non-zero entries in the vector g can denote motion actuation of the system. In step 206, the critical event energy minimizer 122 receives the last state of the system simulated under the first set of constraints. In a preferred embodiment of the present invention, the last state of the system simulated under the first set of constraints occurs at time $t_2$. Alternatively, the last state of the system simulated under the first set of constraints can occur at a time after time $t_2$.

In step 208, the critical event energy minimizer 122 calculates the first state x of the physical system under the second set of constraints. In a preferred embodiment of the present invention, the first state x of the physical system is calculated at time $t_2$. Alternatively, the first state x of the physical system is calculated at a time after time $t_2$. In a preferred embodiment of the present invention, the critical event energy minimizer 122 minimizes the energy of the error between the last state under the first set of constraints and the first state under the second set of constraints. This minimization is further preferred to occur at time $t_2$, but can also occur at a time after time $t_2$. In another embodiment of the present invention, the critical event energy minimizer 122 minimizes the energy of the error between the first state under the second set of constraints and an intermediate state derived from the last state that was simulated under the first set of constraints. The intermediate state can be calculated based on the second set of constraints and using the last state that was simulated under the first set of constraints as initial conditions to the DAEs corresponding to the second set of constraints. In one embodiment of the present invention, the intermediate state is calculated at the same time sample as the first state of the system under the second set of constraints. Let $x_0$ denote either the last state simulated under the first set of constraints or the intermediate state derived from the last state and the energy of the error, $T(x)$, can be expressed as the following assuming the body elements have mass or inertia given by the mass matrix M $$T(x) = \frac{1}{2}(x - x_0)^T M(x - x_0). \qquad (2)$$

Substituting x in equation (2) with equation (1), then energy of the error can be expressed as a function of y, the (new) independent states under the second set of constraints:

$$T(y) = \frac{1}{2}(Py + g - x_0)^T M(Py + g - x_0). \qquad (3)$$

In this equation, P is the matrix representing the mapping from the new set of independent states y to the full set of states x under the new constraints. The desired value for y is obtained by minimizing equation (3) with respect to y:

$$y = (P^T M P)^{-1} P^T M(x_0 - g). \qquad (4)$$

x can then be obtained by substituting equation (4) into equation (1), which yields $$x = P(P^T M P)^{-1} P^T M(x_0 - g) + g. \qquad (5)$$

Equation (5) is then used to calculate the first state simulated under the second set of constraints. Equation (5) can also be understood as a projection from $x_0$ to the manifold defined by the second set of constraints, where the projection result yields the minimum energy of the error (step 210 in FIG. 4). Note that the mass matrix M that is used in the above calculations is the only matrix associated with the quadratic part of the system energy. In general, if the energy of the system can be expressed in the form $T_0 = x^T Mx + 2Bx = \bar{x} M \bar{x} - B^T MB$, with $\bar{x} = x + B$, then the above formulation (equation 5) applies.

The first state simulated under the second set of constraints will ideally occur at time $t_2$, the same time as the detection of the critical event. However, one of ordinary skill in the art will appreciate that the first state simulated under the second set of constraints can be chosen to be at time $t_3 = t_2 + \Delta t$, where $\Delta t$ is the time step, or any other time sample after time $t_2$. In this case, the last state simulated under the first set of constraints may or may not be at time $t_2$ (when the detection of the critical event occurs), and a user or software developer can decide if the last state simulated under the first set of constraints or an intermediate state derived from the last state will be used to minimize the energy of the error with respect to the first state simulated under the second set of constraints.

Using the present invention, the erroneous or inaccurate simulation results obtained at time $t_2$ under the first set of constraints do not propagate to the simulation results at time $t_3$ obtained under the second set of constraints as happened in FIG. 2B. The simulation results for the first state simulated under the second set of constraints are obtained by minimizing the energy of the error between the last state simulated under the first set of constraints and the first state simulated under the second set of constraints. Alternatively, the energy of the error can be minimized between the first state that was simulated under the second set of constraints and an intermediate state derived from the last state that was simulated under the first set of constraints. In a preferred embodiment of the present invention, the last state simulated under the first set of constraints and the first state simulated under the second set of constraints are obtained at the same time sample and the minimization of energy of the error also occurs at the same time sample.

To better understand the present invention, the following is a mechanical example that illustrates how the present invention can be applied. Given two shafts with inertia and connected by a clutch, a fixed-step solver is used to execute the model of the mechanical system before and after the clutch locks. The clutch locking event is assumed to fall between two time samples and it is further assumed that the fixed-step solver does not detect the clutch locking event until the later of the two time samples. The two shafts can be modeled using two states, which are denoted here as $x_1$ and $x_2$. The two shafts can have associated inertia $m_1$ and $m_2$. The system before the locking event is denoted using a superscript A and the system after the locking event is denoted using a superscript B. The superscripts − and + are used to further denote that states right before and right after the constraint change in the simulation (as opposed to the ideal scenario). The state of the system can be denoted by $$X = \begin{bmatrix} x_1 \\ x_2 \end{bmatrix},$$

while the independent states is denoted by Y and the projection matrix relating X and Y is denoted by P. Without loss of generality, assume that there are no motion drivers in this example, then the state of the system can be described as follows: X=PY.

Before the clutch locks, the total (kinetic) energy of the system T can be expressed as $$T^A = \frac{1}{2} m_1 v_{1A}^2 + \frac{1}{2} m_2 v_{2A}^2.$$

and the total momentum of the system N can be expressed as $$N^A = m_1 v_{1A} + m_2 v_{2A}.$$

After the clutch locks, conservation of momentum dictates that the velocity of the composite system and the velocities of the system and the shafts can be expressed as $$v_B = v_{1B} = v_{2B} = \frac{m_1}{m_1 + m_2} v_{1A} + \frac{m_2}{m_1 + m_2} v_{2A}.$$

The momentum of the system is conserved because $$N^B = (m_1 + m_2) v_B = N^A. \quad (6)$$

The energy of the system after the clutch locks becomes $$T^B = \frac{1}{2}(m_1 + m_2)\left(\frac{m_1}{m_1 + m_2} v_{1A} + \frac{m_2}{m_1 + m_2} v_{2A}\right)^2. \quad (7)$$

When $v_{1A} = v_{2A}$, energy is conserved because $$T^B = \frac{1}{2}(m_1 + m_2) v_A^2 = T^A$$

and the transition of the system from before the clutch locks to after the clutch locks is said to be elastic.

This example can also be formulated using the velocities of the shafts as the solver states:

$$X = \begin{bmatrix} x_1 \\ x_2 \end{bmatrix} = \begin{bmatrix} v_1 \\ v_2 \end{bmatrix}. \quad (8)$$

Before the clutch locking event, the two independent states can be expressed as $$Y^A = \begin{bmatrix} y_1^A \\ y_2^A \end{bmatrix}$$

and the projection matrix is just the identity matrix $$P^A = \begin{bmatrix} 1 & 0 \\ 0 & 1 \end{bmatrix}.$$

After the clutch locks, there is only one independent state, hence Y and the projection matrix becomes $$Y^B = [Y^B]$$

$$P^B = \begin{bmatrix} 1 \\ 1 \end{bmatrix}$$

One of ordinary skill in the art will appreciate that the above equations can be used to model other systems in other application domains, such as electrical systems or hydraulics systems. The present invention can also be used with systems that use multiple application domains to model. For example, a mechanical system can use both SimDriveline (mechanical domain) and Simulink (time domain) from The MathWorks, Inc. of Natick, Mass., to model the mechanical system and uses the present invention with the cross-domain model that represents the mechanical system. A cross-domain model can also use both SimMechanics and SimHydraulics to represent a physical system. One of ordinary skill in the art will appreciate that these are merely exemplary application domains and should not be used to limit the present invention.

Suppose that the transition from the old constraints to the new constraints does not occur until the fixed-step solver overshoots the transition time (the time when the clutch locks), then the simulated velocities after the clutch locks are not $v_{1A}$ and $v_{2A}$ as shown above, but rather $$v_{1A-} = v_{1A} + \epsilon_1 \text{ and } v_{2A-} = v_{2A} + \epsilon_2,$$

where $\epsilon_1$ and $\epsilon_2$ are the corresponding difference of the ideal velocities $v_{1A}$, $v_{2A}$ and the simulated velocities $v_{1A-}$ and $v_{2A-}$ at the time when the clutch locking event is detected by the fixed-step solver. The pre-transition momentum and the energy are then expressed as $$N^A = m_1(v_{1A} + \epsilon_1) + m_2(v_{2A} + \epsilon_2) \quad (9)$$

$$T^A = \frac{1}{2}[m_1(v_{1A} + \epsilon_1)^2 + m_2(v_{2A} + \epsilon_2)^2] \quad (10)$$

If the fixed-step solver changes the set of constraints at this point in time (assuming ideal clutch transition), then the new momentum and energy are $$N^{B+} = m_1(v_1 + \epsilon_1) + m_2(v_2 + \epsilon_2) \quad (11)$$

$$T^{B+} = \frac{1}{2}(m_1 + m_2)\left[\frac{m_1}{m_1 + m_2}(v_1 + \epsilon_1) + \frac{m_2}{m_1 + m_2}(v_2 + \epsilon_2)\right] \quad (12)$$

At the transition time, the velocities of the two shafts are equal, hence the velocity of the composite system $m_1 + m_2$ is equal to both the velocities of $m_1$ and $m_2$. After the clutch locks, the velocities of the two shafts are supposed to be the same, but if a fixed-step solver overshoots the transition time, then the velocities are different by the time the fixed-step solver make the transition from the old constraints to the new constraints. For the following equations, the velocity of both of the shafts at the transition time would be assumed to be the velocity of one of the shafts at the transition time. In the prior art, the post-transition momentum and energy is then be expressed as $$N^B = m_1(v_{1A}+\epsilon_1) + m_2(m_{1A}+\epsilon_1)$$

$$T^B = \frac{1}{2}[m_1(v_{1A}+\varepsilon_1)^2 + m_2(v_{1A}+\varepsilon_1)^2]$$

Hence, there is error when compared with the ideal fixed-step post-transition values of equations (11) and (12). The errors are as follows:

$$\Delta N^B = m_2(v_{1A}+\epsilon_1 - v_{2A} - \epsilon_2)$$

$$\Delta T^B = \frac{1}{2}(m_1 + m_2)\left\{(v_{1A}+\varepsilon_1)^2 - \left[\frac{m_1}{m_1+m_2}(v_1+\varepsilon_1) + \frac{m_2}{m_1+m_2}(v_2+\varepsilon_2)\right]^2\right\}$$

Using the present invention, the velocity states in equation (8) are projected as follows:

$$X = P(P^T M P)^{-1} P^T M X_0,$$

From which $$X = v_B \begin{bmatrix} 1 \\ 1 \end{bmatrix}$$

$$v_B = \frac{m_1}{m_1+m_2}(v_1+\varepsilon_1) + \frac{m_2}{m_1+m_2}(v_2+\varepsilon_2)$$

With respect to the ideal fixed-step post-transition values, equations (11) and (12), the errors are zero:

$$\Delta N^B = 0$$

$$\Delta T^B = 0$$

Alternatively, the example can be formulated to use momenta as the solver states:

$$X = \begin{bmatrix} x_1 \\ x_2 \end{bmatrix} = \begin{bmatrix} N_1 \\ N_2 \end{bmatrix}.$$

Before the clutch locking event, there are two independent states $$Y^A = \begin{bmatrix} y_1^A \\ y_2^A \end{bmatrix}$$

and the projection matrix is the identity matrix $$P^A = \begin{bmatrix} 1 & 0 \\ 0 & 1 \end{bmatrix}.$$

After the clutch locks, there is only one independent state, hence Y and the projection matrix becomes $$Y^B = \lfloor y^B \rfloor$$

$$P^B = \begin{bmatrix} 1 \\ \frac{m_2}{m_1} \end{bmatrix}$$

From equation (1), the momentum of the first shaft after the clutch locks is ideally $$N_1^B = \frac{m_1}{m_1+m_2} N^B = \frac{m_1}{m_1+m_2}(N_1^A + N_2^A) \quad (13)$$

Using the present invention, the velocity states in equation (8) are projected as follows:

$$X = P(P^T M P)^{-1} P^T M X_0,$$

from which, the expression $$X = \begin{bmatrix} 1 \\ \frac{m_2}{m_1} \end{bmatrix}\left(1 + \frac{m_2}{m_1}\right)^{-1}(N_1^A + N_2^A) = \begin{bmatrix} 1 \\ \frac{m_2}{m_1} \end{bmatrix} \frac{m_1}{m_1+m_2}(N_1^A + N_2^A)$$

can be obtained. This expression is in agreement with equation (13). The projection scheme of the present invention preserves the momentum and energy from the pre-transition values as both $$\Delta N^B = 0 \text{ and } \Delta T^B = 0.$$

Figure 5A:
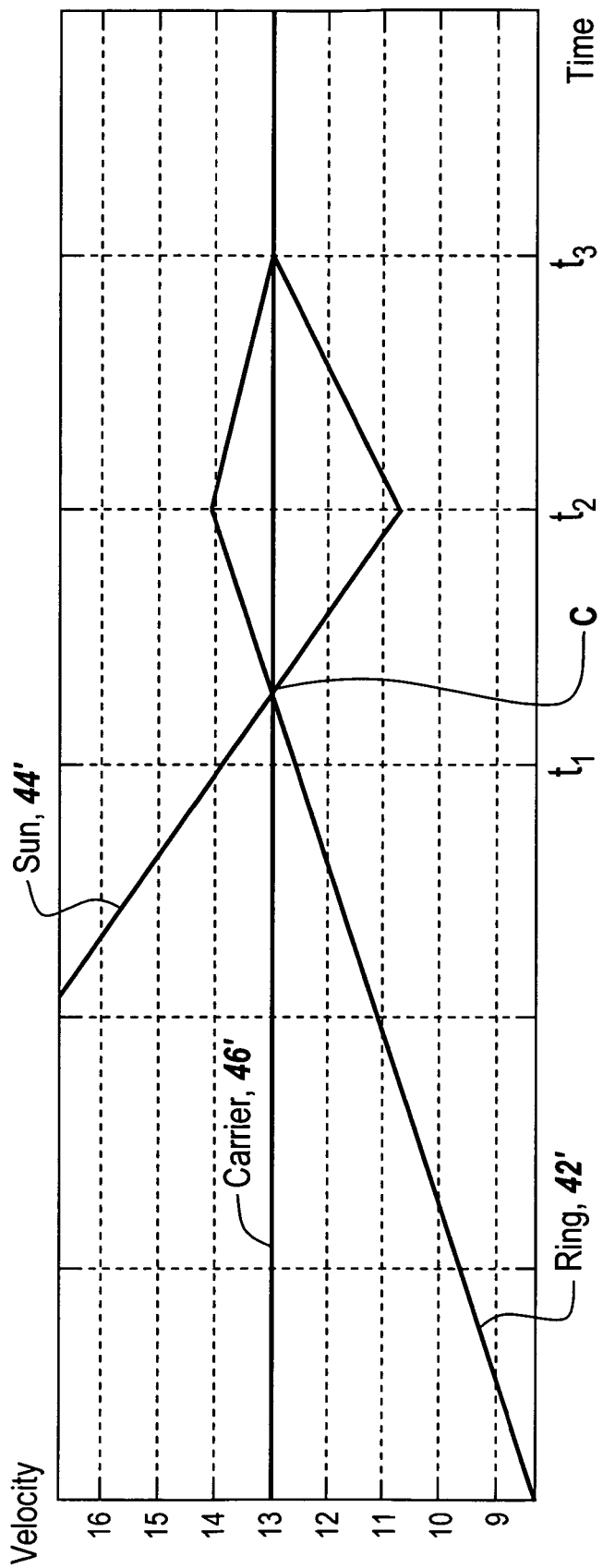
FIG. 5A illustrates simulation results of the system in FIG. 1A around a critical point using an embodiment of the present invention.

FIG. 5A shows the simulation results of the system in FIG. 1A using one embodiment of the present invention. Ring velocity 42', sun velocity 44' and carrier velocity 46' show the respective velocities of the ring gear 22, sun gear 24, and carrier 26 using the present invention. Although the error in the simulation results at time $t_2$ is not corrected, at least the error did not propagate but rather was minimized from time $t_3$ and onward because the minimization of energy of the error occurs at time $t_3$. Hence, the kinetic energy of the system stays the same after the projection at time $t_3$ compared to the kinetic energy of the intermediate state, also at time $t_3$, calculated using the new constraints and the state at time $t_2$ as the initial conditions. As a result the difference between the kinetic energy of the system at time $t_3$ and the kinetic energy of the system at the critical event at time C when the ring velocity 42', sun velocity 44', and carrier velocity 46' are also minimized so that there is no increase in kinetic energy as shown in FIG. 2B.

Figure 5B:
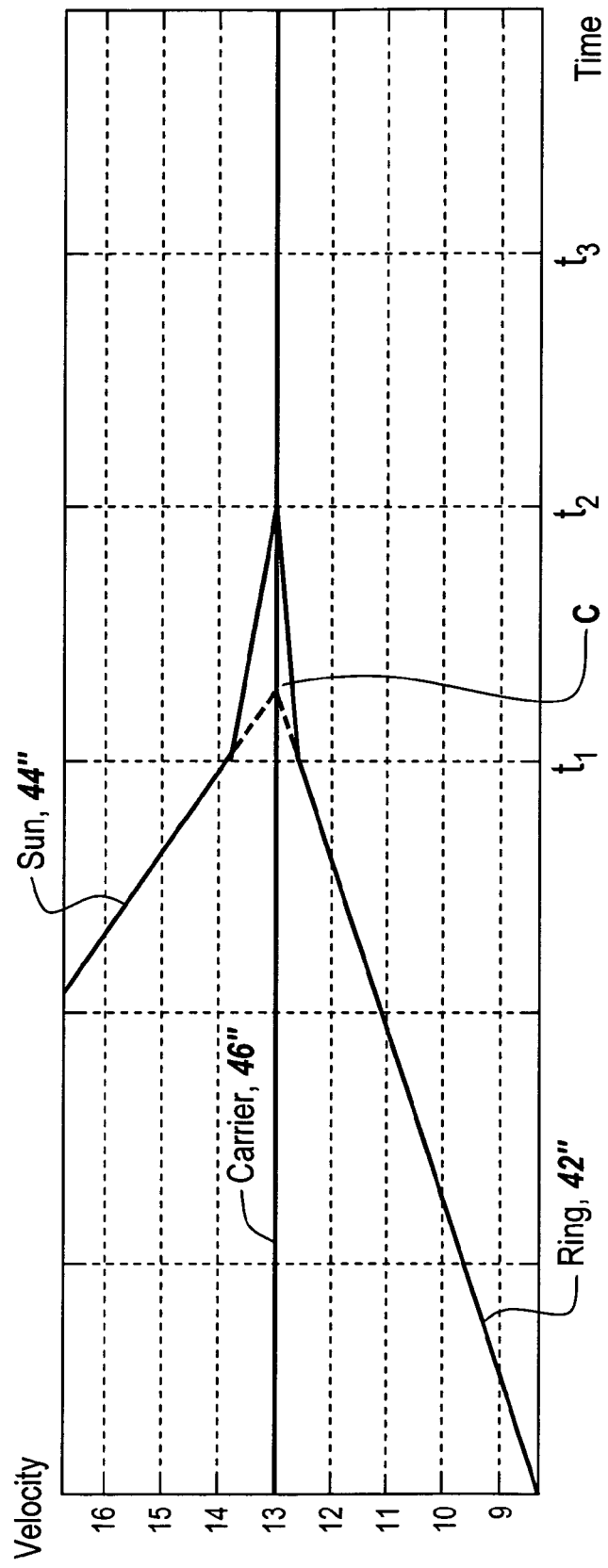
FIG. 5B illustrates simulation results of the system in FIG. 1A around a critical point using a preferred embodiment of the present invention.

FIG. 5B shows the ideal fixed-step simulation results of the system in FIG. 1A using a preferred embodiment of the present invention. Ring velocity 42", sun velocity 44", and carrier velocity 46" show the respective velocities of the ring gear 22, sun gear 24, and carrier 26 using the present invention. The error of simulation results at time $t_2$ is minimized by minimizing the error energy at time $t_2$. The dotted lines show what would have resulted to be the ring velocity 42" and sun velocity 44" if there were a time sample at time C. Using the present invention, the kinetic energy of the system at time $t_2$ and after stays the same as the critical event at time C.

The present invention is also applicable to systems with variable masses or moment of inertia, resulting in parameterized matrices causing nonlinear problem formulations. The following are two approaches that are suitable to practice with an embodiment of the present invention.

First Approach:

Substituting M with $M(x_0)$ in equation (5). Since there is no unknown in $M(x_0)$, $M(x_0)$ can be easily calculated and hence x in equation (5) can be easily obtained.

Second Approach:

Substituting M with M(x) in equation (3) and performing an iterative minimization solve of the new equation to obtain y and the corresponding x. In general, the mass matrix can be constructed from parameters such as mechanical stiffness, electrical inductance, electrical capacity, fluid capacity, fluid inertia, etc. These parameters may be expressed as functions of system variables and can be used to compute the energy in the system. As such, the present invention can be applied in different domains in physics, even if the physical model uses more than one domain in physics.

Figure 6:
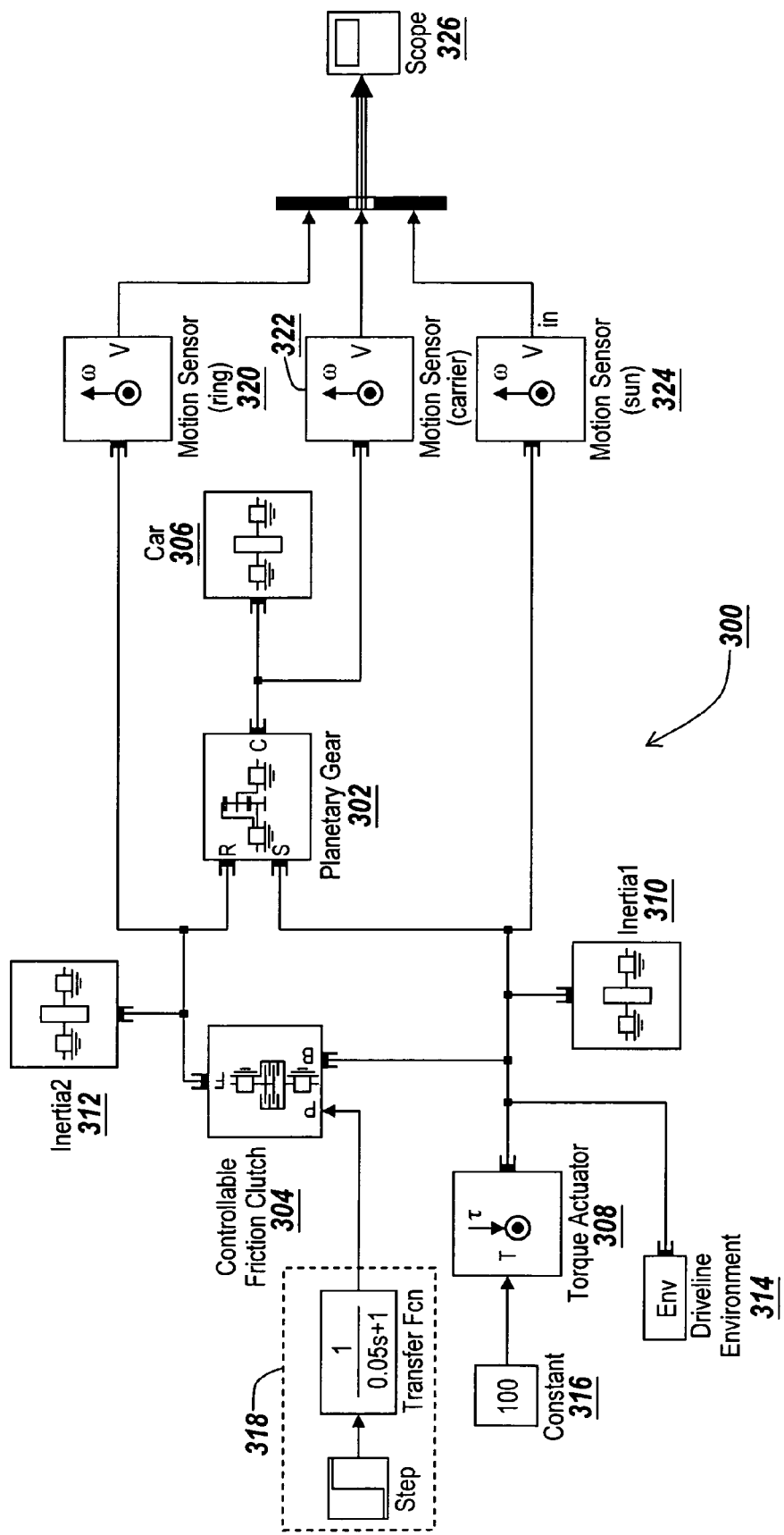
FIG. 6 illustrates a SimDriveline model modeling the system in FIG. 1A.

FIG. 6 illustrates an exemplary model 300 of FIG. 1A using SimDriveline from The MathWorks, Inc. of Natick, Mass. Planetary gear block 302 has an R port that is connected to inertia block 312 that corresponds to the inertia of the ring gear 22. Planetary gear block 302 further has an S port that is connected to inertia block 310 that corresponds to the inertia of the sun gear 24. Planetary gear block 302 also has a C port that is connected to a carrier block 306 that corresponds to the inertia of the carrier 26. The R port of the planetary gear block 302 is further connected to port F of the clutch block 304, where the port F shows that the ring gear 22 is a follower in the clutch locking mechanism. The B port of the clutch block 304 is connected to the S port of the planetary gear block 302 showing that sun gear 24 is a base in the clutch locking mechanism. Port P of the clutch block 304 is getting input (pressure) from input source 318. In this instance, the input source is modeled using a step function and a transfer function. The S port of the planetary gear block 302 is further connected to a torque actuator block 308 showing that sun gear 24 provides torque to the system. The torque actuator block 308 gets input from a constant block 316 so that constant torque is applied to the shaft of the sun gear 24. A driveline environment block 314 is included in the model 300 to specify global environment information and other information that a solver needs to simulate the model 300. Motion sensor blocks 320, 322, and 324 are connected to the R port, C port, and S port of the planetary gear block 302 respectively to sense the angular velocities of the ring gear 22, carrier 26, and sun gear 24, respectively. The sensor blocks 320, 322, and 324 provide the scope block 326 the angular velocities and the scope block 326 plots the data in a figure like the one shown in FIG. 5A.

The present invention has been described above for illustrative purposes based on Simulink®-based applications from The MathWorks, Inc. of Natick, Mass. Nevertheless, those skilled in the art will appreciate that the principles and concepts described above are equally applicable to other modeling environments, such as Rhapsody from I-Logix Inc. of Andover, Mass., TargetLink and Real-Time Interface from dSPACE GmbH of Germany, RT-LABT™ from Opal-RT Technologies, Inc. of Canada, EXITE from EXTESSY AG of Germany, LabVIEW®, MATRIXx, HyperSignal® from National Instruments, Inc. of Austin, Tex., SystemVue™ from Agilent Technologies, Inc. of Palo Alto, Calif., COSSAP from Synopsys, Inc. of Mountain View, Calif., Ptolemy from University of California at Berkeley at Berkeley, Calif., Dymola from Dynasim AB of Sweden, acslXtreme® from The AEgis Technologies Group, Inc. of Huntsville, Ala., 20sim from Controllab Products B.V. of Netherlands, and other like graphical and non-graphical modeling environments that can model and simulate a physical or electrical system. Textual languages to which aspects of this invention can be applied include, but are not limited to, Modelica™ and VHDL with the analog (AMS) extension, VHDL-AMS.

The present invention is not limited to a dedicated subsystem in a model that models a physical system. The present invention is also applicable to a model with different environment settings within the same model. For example, one mechanical machine may be simulated in an environment where gravity of Earth is modeled, whereas another machine may be simulated in an environment with zero gravity, both being part of the same model. Environment settings include, but not limited to, whether the machine should be analyzed in a two-dimensional or three-dimensional model, what assembly and constraint tolerances to apply, or what method to employ for linearization of the machine. The present invention is also applicable to cross-domain models, such as multitasking control systems on top of a physical model, a physical model embedded in an environment for a control system design, a physical model that has event-driven aspects or that is combined with a model part that is executed in an event-driven manner, a physical model used with a state-diagram modeling environment. A mixture of elements from different application domains can be used in a physical model in every level of the hierarchy and it is not necessary to have a dedicated subsystem to have a different environment setting.

In one aspect of the present invention, the model may be constructed by means of an application programming interface (API). This interface may be directly accessed by a user through a set of textual commands, for example, to add blocks of a certain type, to connect blocks, or to set parameter values. Furthermore, the model may be processed in different ways as specified by the textual commands, for example, the model could be compiled, executed, loaded in memory, and the number of elements in the model could be counted, etc. In addition, the model may contain call-back instructions that are executed based on events that are part of the design of the model. For example, when a model is loaded, a sequence of commands may be executed that could affect the model that is being loaded into memory. Similarly, when the parameter dialog of a block is requested by double-clicking on the block, a call-back is initiated that may execute a sequence of commands first before bringing up the parameter dialog.

In another aspect of the present invention, the model may employ data that is stored in a global workspace, i.e., a workspace that can be accessed by any system that is compatible with the modeling environment. This data can include elaborate structures and is not limited to being one or more numeric values. This data can optionally include hierarchy information and can be modified directly by the user or operated on by other systems, for example for the purpose of data acquisition, signal processing, or optimization. Furthermore, the workspace can be organized in a hierarchical fashion, wherein local workspaces exist that can be accessed only by specific parts of the model hierarchy. Symbol resolution rules can be applied to resolve the references to a piece of data within these workspaces. The local workspaces can be associated with subsystems in the model by creating a mask for a subsystem. This mask facilitates the creation of a custom dialog for entering data to derive the values of the data in the local workspaces. Furthermore, the mask may be equipped with a number of call-backs and so may exist without being combined with a local workspace.

In still another aspect of the invention, the model may be employed for analyses such as linearization, trimming, and coverage analysis to determine the range of values that one or a set of simulation scenarios have covered. In case of coverage analysis, the discrete aspects of the model can be analyzed in terms of decision coverage, condition coverage, modified condition/decision coverage (MC/DC), etc. Graphical affordances allow depicting the coverage analysis results on the model. Furthermore, the model may be employed for optimizations, such as response optimization in the time and/or frequency domain.

In another aspect of the present invention, the model may contain hot-links to system requirements as documented in a database, spreadsheet, text document, or other information container. These hot-links allow automatically navigating back and forth between the system requirements and the model, for example by means of a mouse click. The system requirements may, for example, capture explicit information about the effect of a dynamic constraint on the system behavior.

In still another aspect of the present invention, S-function code is generated from the model. An S-function is a component that can be captured in, for example, C, ADA, and M code, and that adheres to the Simulink® S-function interface. This S-function may include the projection algorithm of the present invention that minimizes the energy of the error. In a further aspect of the present invention, code can be generated from the model. For example, C code can be automatically generated that can be executed in real-time, for example for hardware-in-the-loop simulation, or the C code can be compiled into a shared library such as a dynamic link library (DLL) on versions of the Microsoft® Windows® operating systems. Additionally, a hardware description language (HDL) representation can be generated, for example for hardware accelerated simulation or reconfigurable input/output signal conditioning such as CompactRIO of National Instruments, Inc.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

We claim:

1. A method comprising:
    calculating, using a processor, a first state of a system under a first set of constraints at a first time sample in a simulation of the system;
    calculating, using a processor, a second state of the system under the first set of constraints at a second time sample in the simulation of the system;
    detecting, using a processor, an event signaling a change from the first set of constraints to a second set of constraints, the event occurring between the first time sample and the second time sample; and
    calculating, using a processor, a new state of the system under the second set of constraints at the second time sample, the new state being calculated based at least in part on an energy of error function, the energy of error function being a mathematical composition of:
        an error function that finds a difference between a third state of the system under the second set of constraints and the second state of the system, and
        an energy function for the system as dictated by one or more equations that represent one or more dynamics of the system.

2. The method of claim 1, wherein the simulation is a real-time simulation.

3. The method of claim 1, wherein the simulation is a hardware-in-the-loop simulation.

4. The method of claim 1, wherein a calculated energy of the system before and after the event occurs does not change or stays within a numerical accuracy.

5. The method of claim 1, wherein the second time sample is one time step after the first time sample.

6. The method of claim 1, wherein a fixed-step solver is used to simulate the system.

7. The method of claim 1, wherein a variable-step solver is used to simulate the system.

8. The method in claim 1, wherein the first set of constraints describe a first relationship among a plurality of elements in the system that are being modeled during the simulation before the event occurs and the second set of constraints describe a second relationship among the plurality of elements after the event occurs.

9. The method of claim 1, wherein the calculation of the new state involves a use of a mass matrix or a moment of inertia matrix.

10. The method of claim 9, wherein the mass matrix or the moment of inertia is a parameterized matrix.

11. The method of claim 1, further comprising:
    projecting at least one of:
        the new state of the system under the second set of constraints, or
        an intermediate state of the system onto the second set of constraints.

12. The method of claim 1, wherein the new state of the system under the second set of constraints includes one or more user-specified states.

13. A non-transitory computer-readable medium storing instructions, the instructions comprising instructions for:
    calculating a first state of a system under a first set of constraints at a first time sample in a simulation of the system;
    calculating a second state of the system under the first set of constraints at a second time sample in the simulation of the system;
    detecting an event signaling a change from the first set of constraints to a second set of constraints, the event occurring between the first time sample and the second time sample; and
    calculating a new state of the system under the second set of constraints at the second time sample, the new state being calculated based at least in part on an energy of error function, the energy of error function being a mathematical composition of:
        an error function that finds a difference between a third state of the system under the second set of constraints and the second state of the system, and
        an energy function for the system as dictated by one or more equations that represent one or more dynamics of the system.

14. The medium of claim 13, wherein the first set of constraints describe a first relationship among a plurality of gears before a clutch locks and the second set of constraints describe a second relationship among the plurality of gears after the clutch locks.

15. The medium of claim 13, wherein the calculation of the new state of the system at the second time sample under the second set of constraints involves a use of a mass matrix or a moment of inertia matrix.

16. The medium of claim 15, wherein the mass matrix or the moment of inertia is a parameterized matrix.

17. The medium of claim 13, further comprising instructions for:
projecting at least one of:
the new state of the system under the second set of constraints, or
an intermediate state of the system onto the second set of constraints.

18. The medium of claim 13, wherein the new state of the system under the second set of constraints includes one or more user-specified states.

19. An apparatus comprising:
a processor for executing instructions stored in a memory;
said memory storing instructions for:
calculating a first state of a system under a first set of constraints at a first time sample in a simulation of the system,
calculating a second state of the system under the first set of constraints at a second time sample in the simulation of the system,
detecting an event signaling a change from the first set of constraints to a second set of constraints, the event occurring between the first time sample and the second time sample, and
calculating a new state of the system under the second set of constraints at the second time sample, the new state being calculated based at least in part on an energy of error function, the energy of error function being a mathematical composition of:
an error function that finds a difference between a third state of the system under the second set of constraints and the second state of the system, and
an energy function for the system as dictated by one or more equations that represent one or more dynamics of the system.

20. The apparatus of claim 19, wherein the first set of constraints describe a first relationship among a plurality of gears before a clutch locks and the second set of constraints describe a second relationship among the plurality of gears after the clutch locks.

21. The apparatus of claim 19, wherein the processor calculates the new state of the system under the second set of constraints using a mass matrix or a moment of inertia matrix.

22. The apparatus of claim 21, wherein the mass matrix or the moment of inertia is a parameterized matrix.

23. The apparatus of claim 19, wherein the processor projects the new state onto the second set of constraints in one operation.

24. The apparatus of claim 19, wherein the new state of the system under the second set of constraints includes one or more user-specified states.

25. The method of claim 1, wherein the new state is chosen to minimize the energy of error function.

26. The medium of claim 13, wherein the new state is chosen to minimize the energy of error function.

27. The apparatus of claim 19, wherein the new state is chosen to minimize the energy of error function.

* * * * *